United States Patent [19]

Felix

[11] 4,321,841
[45] Mar. 30, 1982

[54] PRESS SAFETY DEVICE

[75] Inventor: Gerald J. Felix, Wyoming, Mich.

[73] Assignee: Steelcase Inc., Grand Rapids, Mich.

[21] Appl. No.: 138,930

[22] Filed: Apr. 10, 1980

[51] Int. Cl.³ .............................................. F16P 3/06
[52] U.S. Cl. ...................................... 74/615; 100/53; 192/131 R
[58] Field of Search ........................... 74/615; 100/53; 192/131 R

[56] References Cited
U.S. PATENT DOCUMENTS

| | | | |
|---|---|---|---|
| 2,011,047 | 8/1935 | Gaul | 74/615 |
| 2,427,928 | 9/1947 | Shaw | 192/131 R X |
| 2,429,065 | 10/1947 | Korkowski | 192/131 R X |
| 2,642,755 | 6/1953 | Shaw | 74/615 |
| 3,011,610 | 12/1961 | Stiebel et al. | 192/131 R |
| 3,108,491 | 10/1963 | Buker | 74/615 |
| 3,490,310 | 1/1970 | Gill | 74/615 |
| 3,804,002 | 4/1974 | Wingle | 100/53 |
| 3,884,336 | 5/1975 | Williamson | 192/131 R |
| 4,195,722 | 4/1980 | Anderson et al. | 192/131 R |

OTHER PUBLICATIONS

Publication, "Possons Pull-Backs and Hold-Backs," Catalog 20, The Positive Safety Manufacturing Company, Cleveland, Ohio, 1973.

*Primary Examiner*—Allan D. Herrmann
*Attorney, Agent, or Firm*—Price, Heneveld, Huizenga & Cooper

[57] ABSTRACT

The specification discloses a safety device for presses and other similar machines in which stock material is manually inserted between converging machine parts. A ram and sleeve arrangement cooperates with a collar mounted on the moving portion of the machine to insure that the operator's hands are drawn completely back to the safety position prior to the commencement of the machine stroke. In the event that the ram does not operate at the commencement of the press cycle, the collar abuts the sleeve on the downward stroke of the press, and moves the pull-back mechanism therewith to the safety position.

22 Claims, 7 Drawing Figures

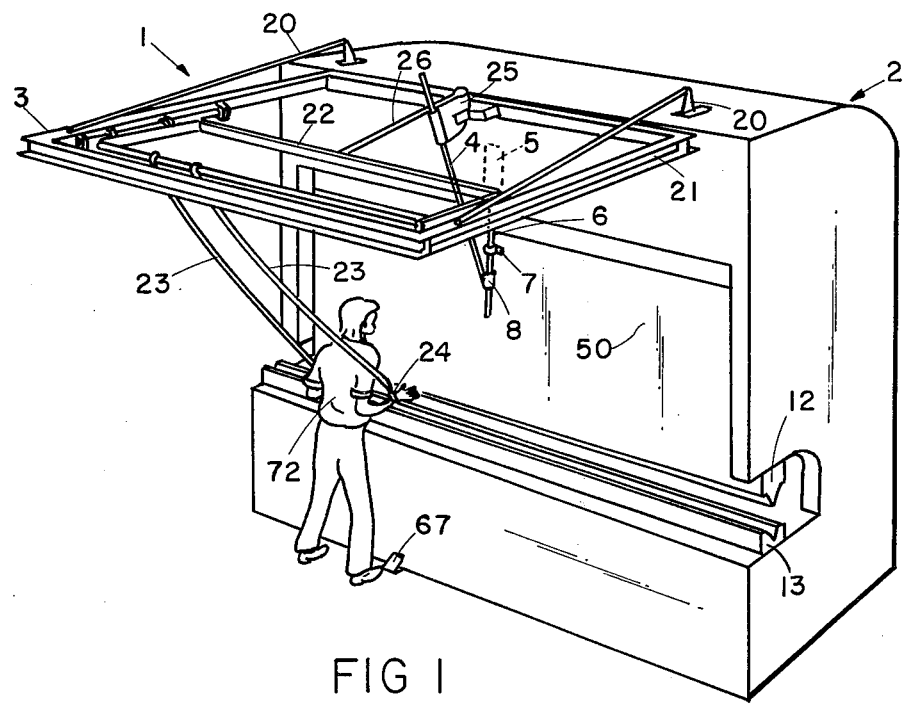
FIG 1
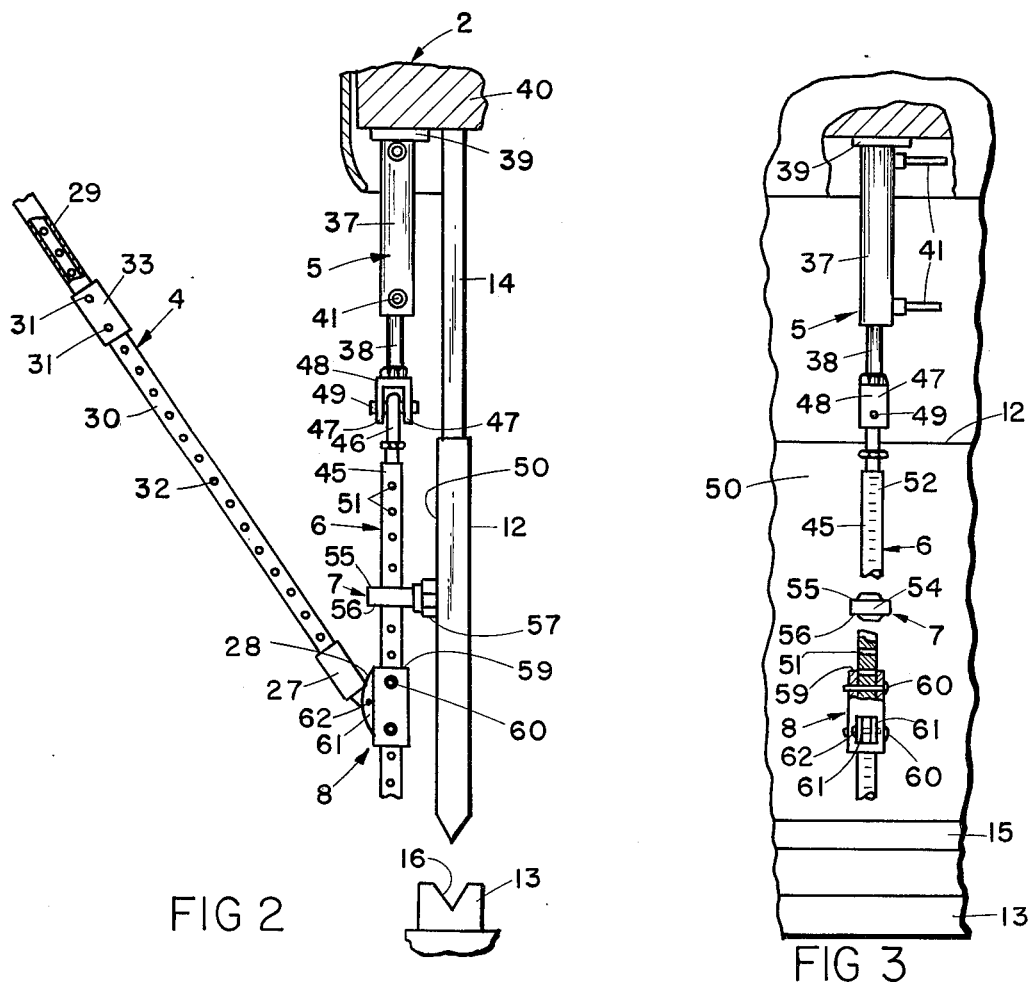
FIG 2
FIG 3

PRESS SAFETY DEVICE

BACKGROUND OF THE INVENTION

The present invention relates to safety devices, and in particular to a pull-back safety mechanism for presses and other similar machines.

Pull-back safety devices are used in conjunction with riveting, staking, eyeletting, resistance welding, metal forming, and a wide variety of other industrial operations in which stock material is manually inserted between converging machine parts. Such devices typically include tethers attached to the arms or wrists of the operator, and include a feed position wherein the operator is permitted sufficient limb movement to place the stock material between the converging parts, such as between mating die halves when the die is open. When the die halves are converged, the safety device is shifted to a safety position, wherein the hands of the operator, if still positioned between the converging machine parts, are pulled back from inbetween the die halves to prevent them from being injured.

Some pull-back safety devices shift between the feed and safety positions with the motion of the descending die. In this manner, the operator's hands are not completely retracted until the die halves are fully converged. These devices must be carefully adjusted for each individual operator to insure that his hands will not be caught between the die halves, even when the press is operated at maximum production speeds.

Other types of pull-back safety devices employ a reciprocating ram to shift the user's hands between the feed and safety positions. The ram is usually operated by a control circuit which activates the ram and draws the operator's hands back at the beginning of the press stroke. Although such devices retract the operator's hands as the stroke motion begins, if the ram should fail to operate, the hands of the press operator are not retracted.

SUMMARY OF THE INVENTION

The present invention provides a safety device for presses and other similar machines. A ram is activated at the beginning of each machine stroke to insure that the hands of the operator are fully retracted before the press starts to move downwardly. In the event that the ram does not operate properly, a pair of abutting members are engaged during the downward stroke of the press, and shift the pull-back mechanism into the safety position. The abutting members preferably comprise a collar mounted on the moving portion of the press, and a sleeve connected with the rod. The sleeve is detachably connected at various positions on the ram to adjust the safety device for variously sized operators. The saftey device insures safe operation of the machine without interfering with the operator's feed motion.

These and many other important advantages of the invention will be further understood and appreciated by those skilled in the art by reference to the following written specification, claims and appended drawings.

BRIEF DESCRIPTION OF THE DRAWINGS

FIG. 1 is a perspective view of a safety device embodying the present invention, shown attached to a press.

FIG. 2 is an enlarged, fragmentary side elevational view of the press and safety device, with portions thereof broken away to reveal internal construction.

FIG. 3 is an enlarged, fragmentary front elevational view of the press and safety device, with portions thereof broken away, and an actuator arm portion removed.

DETAILED DESCRIPTION OF THE PREFERRED EMBODIMENTS

Figure 4:
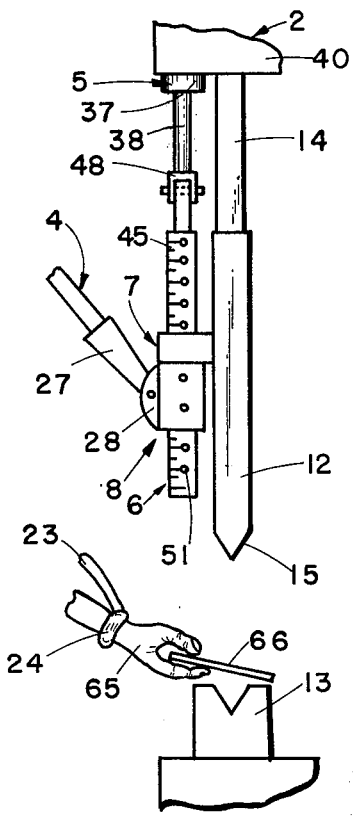
FIG. 4 is a partially schematic, side elevational view of the press and safety device shown in a feed position.

For purposes of description herein, the terms "upper", "lower", "right", "left", "rear", "front", "vertical", "horizontal," and derivatives thereof shall relate to the invention as oriented in FIG. 1. However, it is to be understood that the invention may assume various alternative orientations, except where expressly specified to the contrary.

The reference numeral 1 generally designates a safety device embodying the present invention, adapted for use in conjunction with machines such as press 2 in which stock material is manually inserted between converging parts. A reciprocating pull-back mechanism 3 is connected with press 2 and selectively manipulates the hands of the operator between feed and safety positions by longitudinal translation of an actuator arm 4. A ram 5 is connected with a stationary portion of press 2 and includes a rod 6 which extends through a collar 7 on the moving portion of the press. A sleeve 8 is attached to rod 6 adjacent the free end thereof and is in turn connected with actuator arm 4. Ram 5 is actuated at the beginning of each machine cycle and moves actuator arm 4 to positively insure that the hands of the machine operator are drawn out from inbetween the converging parts of the press to a safety position. In the event that ram 5 does not translate at the beginning of the machine cycle, collar 7 abuttingly engages sleeve 8 during the downward stroke of the press and moves actuator arm 4 therewith to draw back the hands of the user into the safety position.

The safety device 1 is adapted for use in conjunction with a wide variety of machines in which stock material is manually inserted between converging parts, such as machines used for riveting, staking, eyeletting, resistance welding, and the like. In the illustrated structure, safety device 1 is connected with a press 2. Press 2 is in the nature of a brake and includes a vertically oriented, reciprocating die or blade 12, and a stationary die 13. As best illustrated in FIG. 2, blade 12 is supported on shafts 14, which are in turn reciprocated by power cylinders (not shown). Blade 12 is translated in a substantially vertical plane and includes a V-shaped free end 15 which mates with similarly shaped surfaces 16 of the stationary die portion to form materials such as metal parts therebetween.

The pull-back mechanism 3 is connected in an overhead relationship with press 2 by supports 20 and is of a conventional construction which includes a fixed frame 21 and a reciprocating frame 22 mounted therein. A pair of tether lines 23 have the upper ends thereof connected with reciprocating frame 22 and the lower ends thereof provided with wrist bands 24 adapted for connection with the wrists of the machine operator. The actuator arm 4 is connected with a cam mechanism 25, such that longitudinal movement of actuator arm 4 reciprocates frame 22 through a linkage member 26 thereby shifting the tether lines 23 between feed and safety positions. In the feed position (FIG. 4), reciprocating frame 22 is disposed forwardly, toward press 2 at a location which permits the operator's hands to position stock material between die halves 12 and 13. In the safety position (FIGS. 5 and 6), frame 22 is shifted rearwardly, away from press 2 to a location where tethers 23 prevent the operator from positioning any part of his hands between die halves 12 and 13.

The outermost end of actuator arm 4 (FIG. 2) includes a fitting 27 for pivotally mounting the actuator arm with sleeve 8 at a joint 28. In this example, joint 28 is of a clevis-type construction. The illustrated actuator arm 4 includes two telescoping members 29 and 30 which are detachably interconnected by pins 31 to adjust the effective length of the actuator arm. Actuator arm member 30 is rod shaped with a plurality of laterally extending apertures 32 spaced regularly along the length of the rod. Actuator arm member 29 is tubular in construction and telescopically receives rod member 30 therein. Pins 31 are positioned through a sleeve portion 33 of tubular member 29 and securely interconnect the two actuator arm members.

Figure 7:
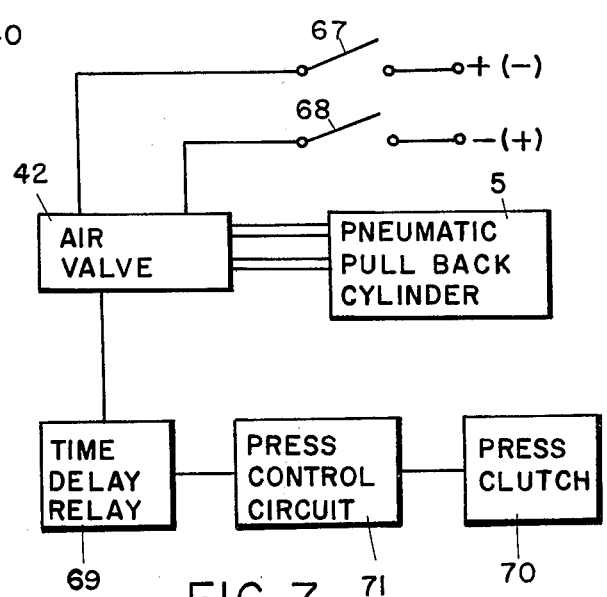
FIG. 7 is a schematic illustration of a control circuit for the safety device.

The ram 5 includes a housing 37, and a rod 38 which is mounted to reciprocate along a plane substantially parallel with the plane in which moving press blade 12 reciprocates. The stroke of ram 5 is selected so that it is substantially the same as the stroke of press 2. The illustrated ram 5 is fluid-operated, and preferably comprises a double acting pneumatic cylinder. The cylinder housing 37 includes a base 39 fixedly attached to an upper, stationary portion 40 of press 2, and depends perpendicularly thereto. Air hoses 41 connect cylinder 5 with a source of pressurized air. The flow of pressurized air to cylinder 5 is controlled by a valve 42 and a machine sequence controller, which are schematically illustrated in FIG. 7, such that the cylinder rod 38 extends before the press begins its downward stroke, and retracts after the press returns to its fully open position.

A control rod 45 is operably connected with the ram rod 38, and is mounted for reciprocation therewith in a plane parallel with the plane of the reciprocating die half 12. As best illustrated in FIGS. 2 and 3, the upper end of control rod 45 is threadedly attached to an eye-shaped fitting 46 which is positioned between the depending side plates 47 of a clevis joint 48. A pin 49 pivotally interconnects ram rod 38 and control rod 45, and permits rotation therebetween along a plane substantially parallel with the front face 50 of the reciprocating press blade 12. Control rod 45 includes a plurality of laterally extending apertures 51 which are spaced regularly along the length of the rod to facilitate connecting sleeve 8 therewith as described in greater detail hereinafter. Control rod 45 is telescopically received through collar 7, and is adapted for reciprocation therein. Gradationally spaced measurement indicia 52 (FIG. 3) is preferably provided on the forward face of control rod 45 to facilitate the adjustment of collar 7 therealong.

The collar 7 is fixedly attached to and reciprocates with the moving press blade 12. Collar 7 has an annularly shaped body 54 with upper and lower faces 55 and 56 disposed mutually parallel and substantially horizontal. The collar body 54 is threadedly attached to a medial portion of press blade 12 at the front face 50 thereof by a fitting 57, and is vertically aligned in a coaxial relationship with ram rod 38 and control rod 45.

The sleeve 8 is connected with control rod 45 at a position thereon disposed downstream of collar 7 in the direction of convergence of the moving press blade 12. In the embodiment illustrated in FIGS. 2 and 3, sleeve 8 is located below collar 7, and includes an upper surface 59 which is annularly shaped for abutment with the lower surface 56 of collar 7. Sleeve 8 is received over control rod 45, and includes a pair of pins 60 which extend through the sleeve and a pair of the associated rod apertures 51 to selectively interconnect the same. Clevis joint 28 is oriented toward the forward portion of the sleeve, and includes a pair of spaced apart ears 61 between which the free end of fitting 27 is received and interconnected by pin 62.

A control arrangement for safety device 1 is schematically illustrated in FIG. 7 and includes a foot pedal switch 67 which is manipulated by the press operator to initiate the press cycle, and a second switch 68 which is operably connected with a portion of the press and reciprocates with die blade 12. Switch 68 is mechanically opened when die blade 12 reaches the top dead center position of the press stroke. Switches 67 and 68 are operably interconnected so that they both open and close together. Air valve 42 is activated and opened when both switches 67 and 68 are closed, thereby communicating pressurized air to pneumatic pull-back cylinder 5 and extending the same. If cylinder 5 is of the double acting type, valve 42 is a three-way valve, and means are provided for reversing the valve position after the press stroke is completed to positively retract pull-back cylinder 5. The control arrangement also includes a time delay relay 69 interposed between air valve 42 and a press clutch 70 which controls the stroking of the press 2, to insure that the air valve is the first element in the press cycle or sequence to actuate. A press control circuit 71 is operably connected between relay 69 and press clutch 70 and opens the circuit to the press clutch under preselected safety conditions.

In use, the safety device 1 is initially adjusted for the individual operator to be running the press 2. The operator connects bands 24 about his wrists, and then assumes a working position in front of the press, as shown in FIG. 1. The safety mechanism 1 is adjusted to insure that in the feed position the operator has sufficient limb movement to insert a piece of stock material between the die halves 12 and 13. With ram 5 deactivated, the operator's hands should be drawn back rearwardly by the tethers 23 as the die halves converge, such that the operator's fingers are not pinched between the die halves even during high speed production. To adjust this function, pins 60 and 31 are removed from their respective sleeves, and sleeve 8 is slid either upwardly or downwardly along control rod 45 until the correct position is established. The indicia 52 can be used to quickly adjust sleeve 8 for a particular individual after the operator has once been initially set up. The sleeve 8 is then reconnected with control rod 45, and sleeve 33 is connected with rod member 30. In this manner, the effective length of actuator rod 4 is automatically adjusted.

Figure 5:
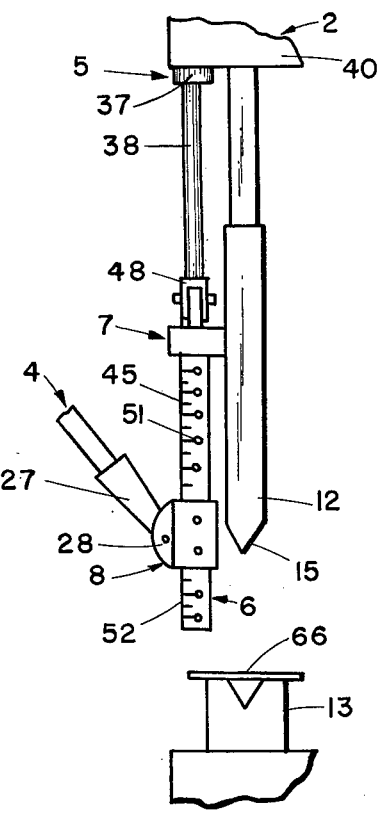
FIG. 5 is a partially schematic, side elevational view of the press and safety device, shown in a safety position at the beginning of the press stroke.

As best illustrated in FIG. 4, in the feed position, wherein die halves 12 and 13 are diverged to their full extent, the effective length of the tethers 23 permits the user's hands 65 to extend forwardly toward the press to a position wherein he can easily place a piece of stock material 66 on the lower die half 13. After the stock material 66 has been properly positioned on the lower die half, the operator normally draws his hands back and activates a machine controller (not shown) which initiates the stroke or cycle of press 2.

To initiate the press cycle, the press operator 72 (FIG. 1) depresses foot switch 67, thereby closing switch 68 and activating air valve 42. Cylinder rod 38 is thereby extended, and translates control rod 45 and connected sleeve 8 donwardly so as to pull actuator arm 4 therewith. As actuator arm 4 is pulled downwardly, it pivots slightly in joint 28 to prevent binding. This downward translation of actuator arm 4 is converted into rearward motion of reciprocating frame 22 by cam 25 (FIG. 1). When cylinder rod 38 is fully extended (FIGS. 5 and 6), the device is in the safety position, wherein tether lines 23 hold the hands of the operator back in a position wherein they cannot be positioned between die halves 12 and 13. If the operator has failed to draw his hands back from the press at the time the die halves begin to converge, the tether lines 23 will positively pull the operator's hands back into the safety position.

Figure 6:
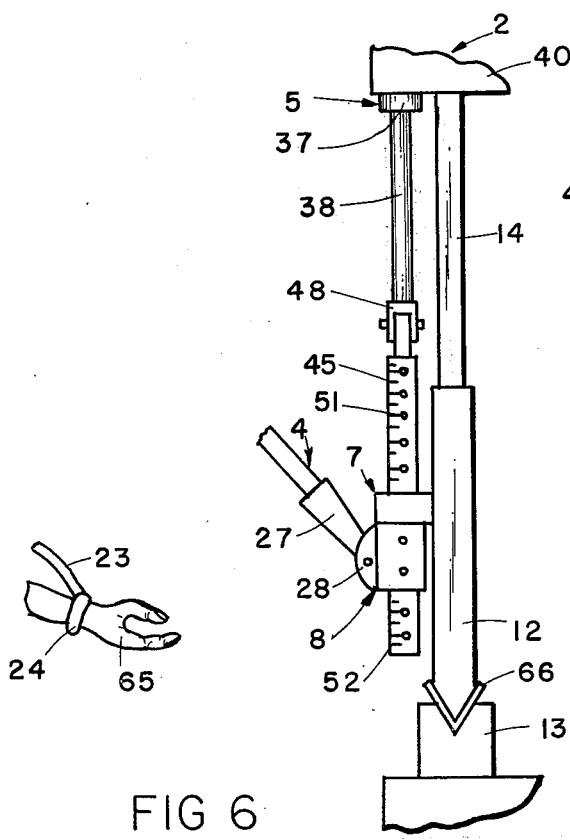
FIG. 6 is a partially schematic, side elevational view of the press and safety device shown in the safety position, with the press at the bottom of its stroke.

As best shown in FIG. 6, after the cylinder rod 38 has been extended and the operator's hands are pulled back to the safety position, the activating signal, which is time delayed by relay 69, actuates press clutch 70, unless control circuit 71 is open. The die blade 12 then descends toward stationary die 13, and forms the piece of stock material 66 therebetween. The press blade 12 is then retracted, and as the press blade approaches the top dead center position, switch 68 is opened, thereby deactivating press clutch 70, reversing the position of air valve 42, and retracting cylinder rod 38 and control rod 45 to permit the user's hands to assume the feed position. In this manner, the hands of the operator are drawn into their fully retracted position before the moving die blade 12 begins its descent, thereby providing improved safety.

In the event that cylinder 5 does not extend properly at the beginning of the machine cycle for reasons such as malfunctioning circuitry, a defective cylinder, an air hose leak, or the like, the machine operator is still provided with a pull-back safety mechanism. As the press blade 12 descends, the lower surface 56 of collar 7 abuttingly engages the upper surface 59 of sleeve 8, and moves actuator arm 4 therewith so as to draw the operator's hands back from the die before the die halves converge to a point which would smash the operator's fingers therebetween. Since the stroke of press 2 and cylinder 5 are substantially equal, when the die halves are fully converged, the operator's hands are drawn back completely to the safety position. In this manner, the device insures that the user's hands are withdrawn to the safety position during press operation, even if the cylinder 5 should fail to properly operate. When the press blade 12 is raised, the pull-back mechanism can be manually shifted to the feed position. However, it is preferred that press 2 be shut down immediately to effect the repair of cylinder 5.

The safety device 1 provides a mechanism which normally retracts the hands of the user before commencement of the machine stroke to provide additional safety for the operator. Further, in the event that cylinder 5 fails to operate as designed, the sleeve and collar arrangement will automatically shift the pull-back mechanism to the safety position. The safety device 1 is easily adjusted to accommodate variously sized machine operators, and insures safe positioning of the operator's hands without interfering with his feed motion.

In the foregoing description, it will be readily appreciated by those skilled in the art that many modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. In a safety device for a machine with coverging parts between which stock material is manually inserted, and having means for insuring selective manipulation of the hands of the machine operator between a feed position and a safety position, the improvement comprising:

a ram adapted for connection with a stationary portion of the machine, and including a rod mounted for reciprocation along a plane substantially parallel with the plane along which the machine parts converge;

a collar adapted for connection with a portion of said machine which reciprocates with a moving one of said converging machine parts, and including a central aperture therethrough in which said rod is slidingly received;

a sleeve connected with said rod at a position thereon disposed downstream of said collar in the direction of convergence of the moving machine portion to which said collar is connected; said sleeve being shaped for selective abutment with said collar;

means for operably connecting said hand manipulation means with said sleeve; and means for activating said ram and translating said rod at the beginning of each machine cycle in a direction identical with the converging motion of said moving one machine part, whereby said rod translation activates said manipulation means and positively insures that the hands of the machine operator are drawn out from inbetween the converging machine parts to said safety position; and in the event that said ram does not translate at the beginning of the machine cycle, said collar abuttingly engages said sleeve during the converging stroke of the machine, and moves said rod therewith to activate said hand manipulation means and draw the hands of the user into the safety position.

2. A safety device as set forth in claim 1, wherein:
said ram comprises a vertically oriented, fluid-operated cylinder which extends and retracts to shift said hand manipulating means between said safety and feed positions respectively.

3. A safety device as set forth in claim 2, wherein:
said rod includes a plurality of laterally extending apertures spaced along the length thereof through which pins are received to adjustably interconnect said rod and said sleeve for adjusting the safety device for variously sized operators.

4. A safety device as set forth in claim 1, wherein:
said ram has a stroke which is substantially commensurate with the stroke of the machine.

5. In a safety device for a machine with converging parts between which stock material is manually inserted, and having means for insuring selective manipulation of the hands of the machine operator between a feed position and a safety position, the improvement comprising:

a ram adapted for connection with a stationary portion of the machine, and including a rod mounted for reciprocation along a plane substantially parallel with the plane along which the machine parts converge;

first means adapted for connection with a portion of said machine which reciprocates with a moving one of said converging machine parts, and including a hollow portion in which said rod is slidingly received;

second means connected with said rod at a position thereon disposed downstream of said first means in the direction of convergence of the moving machine portion to which said first means is connected; said second means being shaped for selective abutment with said first means;

means for operably connecting said hand manipulation means with said rod; and means for activating said ram and translating said rod at the beginning of each machine cycle in a direction identical with the converging motion of said moving one machine part, whereby said rod translation activates said manipulation means and positively insures that the hands of the machine operator are drawn out from inbetween the converging machine parts to said safety position; and in the event that said ram does not translate at the beginning of the machine cycle, said first means abuttingly engages said second means during the converging stroke of the machine, and moves said rod therewith to activate said hand manipulation means and draw the hands of the user into the safety position.

6. A safety device as set forth in claim 5, wherein:
said ram comprises a vertically oriented, fluid-operated cylinder which extends and retracts to shift said hand manipulating means between said safety and feed positions respectively.

7. In a safety device for presses and the like which have a stationary die half and a reciprocating die half between which stock material is manually inserted, the improvement comprising:

means operably connected with the machine operator for positively withdrawing the hands of the operator from inbetween the die halves during the stroke of the press; said withdrawing means having a feed position wherein the operator is permitted sufficient limb movement to place the stock material between the die halves, and a safety position wherein the hands of the operator cannot be positioned between the die halves; said withdrawing means including an actuator arm which is longitudinally translated to shift said withdrawing means between the feed and safety positions;

a ram adapted for connection with a stationary portion of the press, and including a reciprocating ram rod;

a control rod operably connected with said ram rod and mounted for reciprocation therewith in a plane parallel with the plane along which said reciprocating die half translates;

a collar adapted for connection with a moving portion of said machine which translates with said reciprocating die half; said collar including an aperture in which said control rod is telescopingly received;

a sleeve connected with said control rod at a position thereon disposed downstream of said collar in the direction of convergence of said moving machine portion; said sleeve being shaped for abutment with said collar;

means on said sleeve for operably connecting said actuator arm therewith;

means for activating said ram and translating said control rod at the beginning of each machine cycle in a direction identical with the converging motion of said moving machine part, whereby said control rod translation moves said sleeve and the actuator arm therewith from the feed position to the safety position to positively insure that the hands of the operator are disposed completely out from inbetween said die halves prior to the commencement of the machine stroke; and in the event said ram rod does not translate, said collar abuttingly engages said sleeve during the converging stroke of the moving portion of the machine and moves said sleeve and said rod therewith, thereby translating the actuator arm and pulling back the hands of the operator to the safety position.

8. A safety device as set forth in claim 7, wherein:
said sleeve is connectable with said control rod at various vertically spaced apart positions to adjust the safety device for variously sized operators.

9. A safety device as set forth in claim 8, wherein:
said control rod includes regularly spaced indicia thereon to facilitate adjustment of said sleeve thereon.

10. A safety device as set forth in claim 8, wherein:
said ram comprises a pneumatic cylinder.

11. A safety device as set forth in claim 7, wherein:
said connecting means is adapted for pivotally interconnecting said sleeve and said actuator arm.

12. A safety device as set forth in claim 7, wherein:
said control rod is disposed substantially vertically.

13. A safety device as set forth in claim 12, including:
a clevis joint pivotally interconnecting said ram rod and said control rod.

14. A safety device as set forth in claim 13, wherein:
said ram and said plane of die reciprocation are disposed substantially vertically.

15. A safety device as set forth in claim 7, wherein:
said ram has a stroke which is substantially commensurate with the stroke of the press.

16. In press machines and the like having a stationary die half and a reciprocating die half between which stock material is manually inserted, and means for positively withdrawing the hands of the operator from inbetween the die halves during the stroke of the press, wherein said hand withdrawing means includes an actuator arm which is longitudinally translated to operate said means, the improvement comprising:

a ram connected with a stationary portion of said press, and including a reciprocating rod;

a control rod operably connected with said ram rod and reciprocating therewith in a plane parallel with the plane along which said reciprocating die half translates;

a collar connected with a moving portion of said machine which translates with said reciprocating die half; said collar including an aperture in which said control rod is telescopingly received;

a sleeve connected with said control rod at a position thereon disposed downstream of said collar in the direction of convergence of said moving machine portion; said sleeve being shaped for abutment with said collar;

means for connecting said actuator arm with said sleeve;

means for activating said ram and translating said control rod at the beginning of each machine cycle in a direction identical with the converging motion of the reciprocating die half, whereby control rod translation moves said sleeve and said actuator arm therewith to positively insure that the hands of the operator are disposed in a safety position completely out from inbetween said die halves prior to the commencement of the machine stroke; and in the event said ram rod does not translate, said collar abuttingly engages said sleeve during the converging stroke of said moving portion of said machine and moves said sleeve and said rod therewith, thereby translating said actuator arm and pulling back the hands of the operator to said safety position.

17. A press machine as set forth in claim 16, wherein: said ram has a stroke which is substantially commensurate with the stroke of said press machine during the operation of said die halves.

18. A machine as set forth in claim 17, including:
means for adjusting the effective length of said actuator arm.

19. A machine as set forth in claim 17, wherein:
said connecting means pivotally interconnects said sleeve and said actuator arm.

20. A machine as set forth in claim 18, including:
means for adjustably interconnecting said rod and said sleeve at various positions along said rod to adjust said safety device for variously sized operators.

21. A machine as set forth in claim 20, wherein:
said hand withdrawing means has a feed position wherein the operator is permitted sufficient limb movement to place the stock material between the die halves, and a stroke position wherein the hands of the operator cannot be positioned between the die halves.

22. A machine as set forth in claim 21, wherein:
said ram comprises a pneumatic cylinder which is vertically oriented and extends and retracts to reciprocate said actuator arm and shift said hand withdrawing means between said feed and stroke positions respectively.

* * * * *

UNITED STATES PATENT AND TRADEMARK OFFICE
CERTIFICATE OF CORRECTION

PATENT NO. : 4,321,841

DATED : March 30, 1982

INVENTOR(S) : Gerald J. Felix

It is certified that error appears in the above—identified patent and that said Letters Patent is hereby corrected as shown below:

Column 5, line 13:

"donwardly" should be --downwardly--

Column 6, Claim 1, line 16:

"coverging" should be --converging--

Signed and Sealed this

Twenty-ninth Day of June 1982

[SEAL]

Attest:

GERALD J. MOSSINGHOFF

Attesting Officer     Commissioner of Patents and Trademarks